US012771274B2

(12) United States Patent
Nagura et al.

(10) Patent No.: US 12,771,274 B2
(45) Date of Patent: Oct. 20, 2026

(54) MOTOR DRIVER

(71) Applicant: DENSO CORPORATION, Kariya-city (JP)

(72) Inventors: Koki Nagura, Kariya-city (JP); Hideki Kabune, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 228 days.

(21) Appl. No.: 18/651,235

(22) Filed: Apr. 30, 2024

(65) Prior Publication Data

US 2024/0283384 A1 Aug. 22, 2024

Related U.S. Application Data

(63) Continuation of application No. PCT/JP2022/038969, filed on Oct. 19, 2022.

(30) Foreign Application Priority Data

Nov. 2, 2021 (JP) ................................ 2021-179685

(51) Int. Cl.
*H02P 27/06* (2006.01)
*H02P 25/18* (2006.01)

(52) U.S. Cl.
CPC ............ *H02P 25/186* (2013.01); *H02P 27/06* (2013.01); *H02P 2201/07* (2013.01)

(58) Field of Classification Search
CPC ..... H02P 25/186; H02P 27/06; H02P 2201/07
See application file for complete search history.

(56) References Cited

U.S. PATENT DOCUMENTS 8,878,474 B2 * 11/2014 Kezobo ............... H02P 29/0241 318/434
10,486,736 B2 * 11/2019 Uryu ...................... B62D 5/046
2007/0120520 A1 * 5/2007 Miyazaki .............. B60L 15/025 318/801

(Continued)

FOREIGN PATENT DOCUMENTS

JP 2017118641 A * 6/2017

OTHER PUBLICATIONS

U.S. Appl. No. 18/651,298 and its entire file history.

*Primary Examiner* — Thai T Dinh
(74) *Attorney, Agent, or Firm* — Precision Patents, P.C.

(57) ABSTRACT

A motor driver includes an inverter, a multiphase pre-driver circuit, a controller and motor relays. The inverter includes pairs of an upper-arm switching element and a lower-arm switching element being connected in series between a ground line and a power supply line, and supplies power to a multiphase motor by converting direct current power of a battery. The multiphase pre-driver circuit drives the upper-arm and lower-arm switching elements. The controller commands the multiphase pre-driver circuit to drive the switching elements, and controls electrical conduction from the inverter to the multiphase motor. The motor relays interrupt a current flowing from the multiphase motor to the inverter during an off state. The multiphase pre-driver circuit includes a charge pump. The motor relays are turned on by an output voltage of the charge pump during an operation of the charge pump in a situation apart from that the controller provides an instruction.

5 Claims, 6 Drawing Sheets

(56) References Cited

U.S. PATENT DOCUMENTS

| | | | | |
|---|---|---|---|---|
| 2011/0018374 | A1 * | 1/2011 | Yamasaki | H02K 11/33 310/68 B |
| 2014/0055059 | A1 | 2/2014 | Uryu et al. | |
| 2018/0138811 | A1 * | 5/2018 | Nakagawa | H03K 17/063 |
| 2019/0308657 | A1 * | 10/2019 | Uryu | H02M 7/53871 |

* cited by examiner

MOTOR DRIVER

CROSS REFERENCE TO RELATED APPLICATIONS

The present application is a continuation application of International Patent Application No. PCT/JP2022/038969 filed on Oct. 19, 2022, which designated the U.S. and claims the benefit of priority from Japanese Patent Application No. 2021-179685 filed on Nov. 2, 2021. The entire disclosures of all of the above applications are incorporated herein by reference.

TECHNICAL FIELD

The present disclosure relates to a motor driver.

BACKGROUND

A motor driver may convert a direct-current (DC) power of a battery through an inverter and supply the converted power to a multiphase motor. For example, an electric motor driver may be provided with multiple motor relays, each of which may interrupt a current path connected to a motor winding and a connection node between arms of a corresponding one of phases of the inverter. The motor relays may be driven by a common driver circuit with a reverse connection protective relay.

SUMMARY

The present disclosure describes a motor driver including an inverter, a multiphase pre-driver circuit, a controller, and motor relays.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
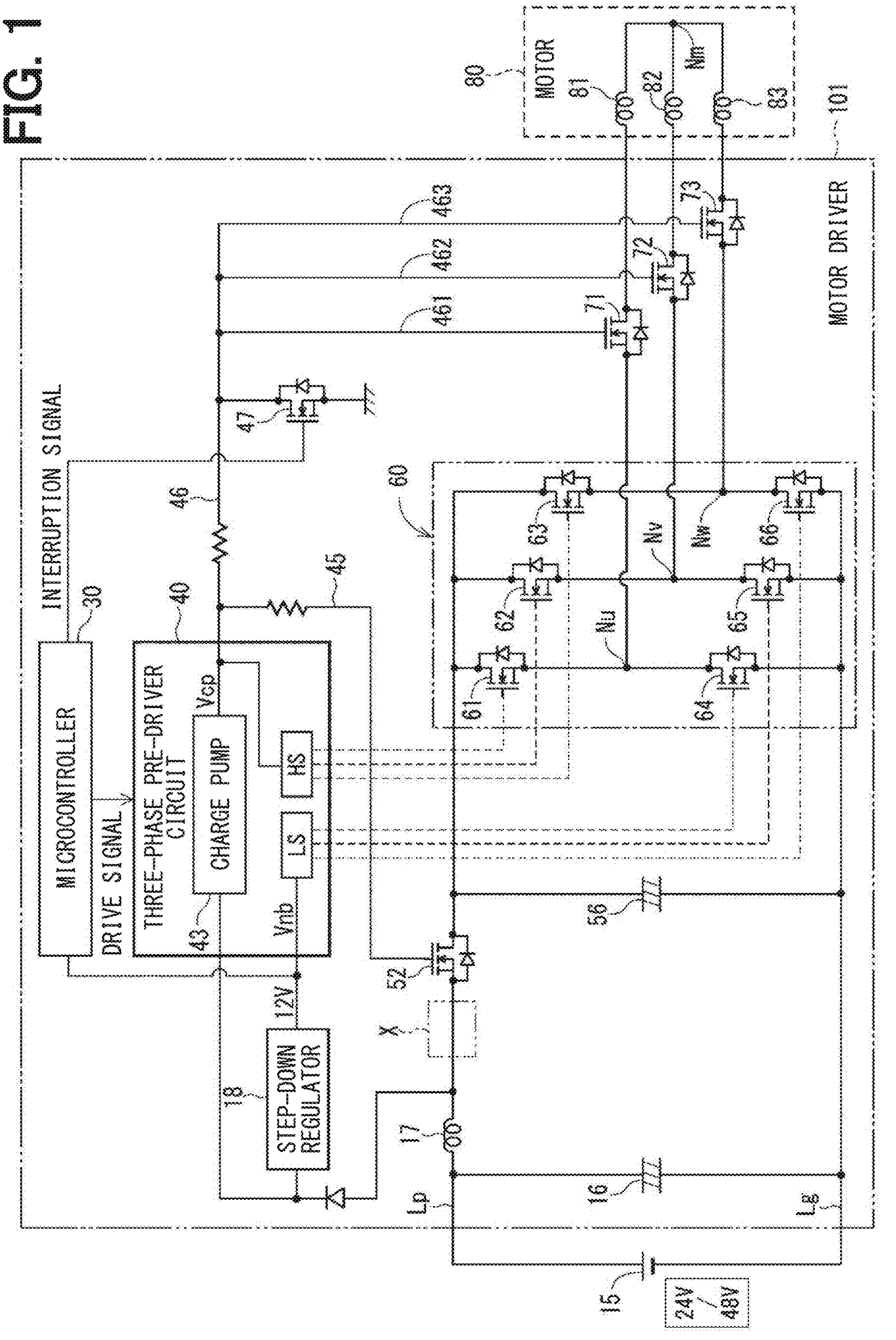
FIG. 1 is a configuration diagram of a motor driver according to a first embodiment.

A driver for an auxiliary motor adapted to a vehicle may be designed with a 12-volt battery. However, the auxiliary battery voltage for an electric vehicle may be increased to 24 volts or 48 volts, which exceeds the voltage tolerance of a conventional 12-volt drive circuit. Therefore, in addition to an inverter capable of operating at a high voltage, a driver circuit may be required to drive motor relays, which may pose challenges in terms of downsizing and high integration of a motor drive system.

According to an aspect of the present disclosure, a motor driver includes an inverter, a multiphase pre-driver circuit, a controller, and motor relays. The inverter includes pairs of an upper-arm switching element and a lower-arm switching element. Each of the pairs is provided for a corresponding one of phases and connected in series between a power supply line and a ground line. The power supply line is connected to a battery. The inverter converts DC power of a battery and then supplies the converted power to the multiphase motor.

The multiphase pre-driver circuit is operated by a voltage supplied from the battery to drive the switching elements included in the inverter. The controller provides a drive signal to the multiphase pre-driver to command the multiphase pre-driver to drive the switching elements, and controls the electrical conduction of the multiphase motor from the inverter.

The motor relays are semiconductor switching elements. Each motor relay is connected between an inter-arm connection node and a corresponding one of phase windings of the multiphase motor. The inter-arm node is a connection node located between the upper-arm switching element and the lower-arm switching element provided in each of the pairs provided for the respective phases of the motor. When the motor relay is in an off state, a current flowing from the multiphase motor to the inverter is interrupted.

The multiphase pre-driver circuit includes a charge pump that boosts a voltage of the battery. An output end of the charge pump is connected to the gate of the motor relay provided for each phase of the motor. The motor relay provided for each phase is turned on by an output voltage of the charge pump during an operation of the charge pump in a situation apart from that the controller provides an instruction.

As a result, a driver circuit targeted to the motor relay is not required. Thus, it is possible to drive the motor relay with a simple configuration. For example, in a case where the battery voltage is boosted from 12 volts to 24 volts or 48 volts, it is also possible to drive the motor relay even though a voltage of the charge pump is raised to a high voltage for driving the inverter.

The following describes motor drivers according to multiple embodiments with reference to the drawings. In the multiple embodiments, substantially the same components are denoted by the same reference numerals, and a description of the same components will be omitted. The following first to fourth embodiments are collectively referred to as "present embodiment". The multiphase motor described in the present embodiment corresponds to a three-phase motor, and the multiphase pre-driver circuit corresponds to a three-phase pre-driver circuit. The motor driver according to the present embodiment converts direct-current (DC) power of a battery and then supplies the converted power to a steering assistive motor in an electric power steering apparatus. The steering assistive motor includes a three-phase brushless motor.

The voltage of the auxiliary battery installed in vehicles has traditionally been 12 volts, but in this embodiment, it is mainly assumed to be 24 volts or 48 volts, which are expected to be adopted in future electric vehicles. "24V/48V" in the drawings and the following description means "24 volts or 48 volts." However, even when using a 12-volt battery, the configuration according to the present embodiment is basically the same. The present embodiment may be applied not only to electric vehicles but also to engine vehicles.

Specifically, the ECU of the electric power steering apparatus functions as a motor driver. The ECU includes, for example, a microcomputer, a customized integrated circuit, and the like, and has a CPU (not shown), a ROM, a RAM, an I/O, and a bus line connecting these components. The ECU performs required control by executing software processing or hardware processing. The software processing may be implemented by causing the CPU to execute a program. The program may be stored beforehand in a memory device such as a ROM, that is, in a readable non-transitory tangible storage medium. The hardware processing may be implemented by a special purpose electronic circuit.

First Embodiment

FIG. 1 illustrates the configuration of a motor driver 101 according to the first embodiment. The motor driver 101 includes, for example, an inverter 60, a three-phase pre-driver circuit 40, a microcontroller 30, and motor relays 71, 72, 73. The microcontroller 30 corresponds to a controller. Although FIG. 1 illustrates the configuration of the motor driver 101 with a single system, a redundant configuration of two or more systems may be used. For example, in a motor driver with a dual system, the power is supplied from two inverters to a double-winding motor having two sets of windings.

The inverter 60 is provided between a power supply line Lp and a ground line Lg. The power supply line Lp is connected to a positive electrode of a battery 15. The ground line Lg is connected to a negative electrode of the battery 15. The inverter 60 includes upper and lower arm switching elements 61 to 66, which are connected in series between the power supply line Lp and the ground line Lg. The upper and lower arm switching elements 61 to 66 are provided for respective three phases. The upper arm switching elements 61, 62, and 63 of the U phase, V phase, and W phase and the lower arm switching elements 64, 65, and 66 of the U phase, V phase, and W phase are connected in a bridge configuration. In the present embodiment, MOSFETs are used as the switching elements 61 to 66 of the inverters 60. In the present embodiment, the MOSFET is an n-channel type.

Connection nodes between the upper-arm switching elements and the lower-arm switching elements of phases are defined as inter-arm connection nodes Nu, Nv, Nw, respectively. The inter-arm connection nodes Nu, Nv, and Nw are connected to three-phase windings 81, 82, and 83 of the motor 80, respectively. The inverter 60 converts DC power of the battery 15 and then supplies the converted power to the three-phase windings 81, 82, 83. For example, when the motor 80 is in a Y-connection, the three-phase windings 81, 82, 83 are connected at a neutral node Nm. However, the three-phase windings 81, 82, and 83 may also be in delta connection.

An inverter capacitor 56 is connected to the inverter 60 in parallel between the power supply line Lp and the ground line Lg, and is charged by the voltage applied to the inverter 60. During normal operation of a motor driver 101, the inverter capacitor 56 functions as a smoothing capacitor.

A filter capacitor 16 and a choke coil (inductor) 17 are provided on the battery 15 side of the inverter 60. The filter capacitor 16 and the choke coil 17 are included in a noise countermeasure LC filter circuit. The filter capacitor 16 and the inverter capacitor 56 are, for example, polar aluminum electrolytic capacitors. The choke coil 17 is provided on the power supply line Lp.

In FIG. 1, the reverse connection protective relay 52 is connected to the power supply line Lp between the choke coil 17 and the inverter 60. The reverse connection protective relay 52 is connected to a freewheeling diode in parallel that allows current flow from the battery side to the power converter side, and at the same time, interrupts the current flow from the inverter 60 side to the battery 15 side when it is turned off. For example, in the reverse connection protective relay 52 having a MOSFET, a parasitic diode of the MOSFET functions as a freewheeling diode. However, the reverse connection protective relay 52 may be provided on the ground line Lg.

Additionally, a power supply relay may be provided at the position X shown by a two-dot chain line, that is, on the battery 15 side of the reverse connection protective relay 52. In this situation, the power supply relay is connected to a freewheeling diode in parallel that allows current flow from the inverter 60 side to the battery 15 side, and at the same time, interrupts the current flow from the battery 15 side to the inverter 60 side when it is turned off.

The motor relays 71, 72, 73 are provided in a motor current path between the inter-arm connection nodes Nu, Nv, Nw of corresponding phases and the phase windings 81, 82, 83, respectively. The motor relays 71, 72, 73 are MOSFETs being semiconductor switching elements. The parasitic diodes conduct current from the inter-arm connection nodes Nu, Nv, Nw to the three-phase windings 81, 82, 83. The motor relays 71, 72, 73 interrupt the current from the motor 80 side to the inverter 60 side when the motor relays 71, 72 73 are in the off state.

Although not shown, a current sensor for detecting phase current is provided at the inverter 60 or each phase motor current path. During the normal operation of the motor driver 101, the microcomputer (controller) 30 calculates a drive signal for the inverter 60 by current feedback control based on the phase current detection value and the motor rotation angle so that the motor 80 outputs the command torque. The integrated IC may share a part of the function of the controller executed by the microcontroller 30. In the case of a dual-system configuration, control information may be mutually communicated between the respective microcomputers of individual systems.

Figure 2:
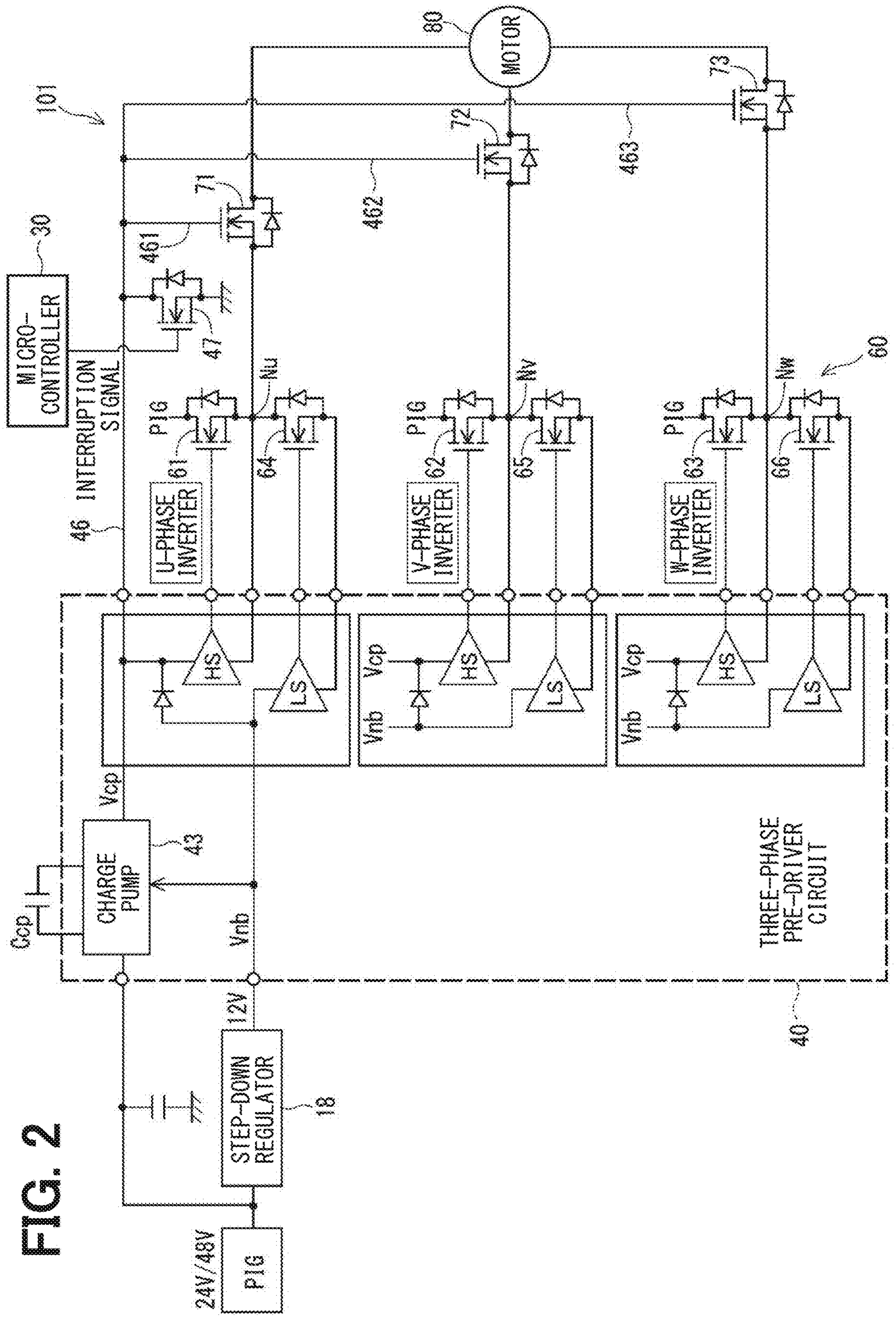
FIG. 2 is a circuit diagram showing a motor relay drive configuration of the motor driver according to the first embodiment.

In the following, FIG. 2 will be referred to in conjunction with FIG. 1. FIG. 2 particularly illustrates the configuration of the three-phase pre-driver circuit 40 and the drive configuration of the motor relays 71, 72, and 73. The three-phase pre-driver circuit 40 is operated by the voltage supplied from the battery 15, and drives the switching elements 61 to 66 of the inverter 60. The microcontroller 30 commands a drive signal to the three-phase pre-driver circuit to control electrical conduction from the inverter 60 to the three-phase motor 80.

The three-phase pre-driver circuit 40 is supplied by a power supply voltage of 24V/48V from the power supply line Lp located after the choke coil 17. In FIG. 2, the power supply voltage of 24V/48V is indicated as "PIG". Further, a power supply voltage of 12V is supplied from the power supply line Lp via a step-down regulator 18. If the battery voltage is 12V, the step-down regulator 18 is not required.

The three-phase pre-driver circuit 40 includes a charge pump 43 that boosts the battery voltage. The output voltage of the charge pump 43 is referred to as a charge pump voltage Vcp. Furthermore, the voltage of 12V provided via the step-down regulator 18 is referred to as a non-boosted voltage Vnb. The charge pump voltage Vcp is output to the gates of upper arm (high side) switching elements 61 to 63. The non-boosted voltage Vnb is output to the gates of the lower arm (low side) switching elements 64 to 66. In the drawing, "HS" indicates the high side, and "LS" indicates the low side.

While the power supply voltage is being supplied to the three-phase pre-driver circuit 40, the charge pump 43 superimposes the voltage charged in the capacitor Ccp and basically continues to output a constant voltage at all times. When the supply of power supply voltage to the three-phase pre-driver circuit 40 is interrupt, or when the charge pump voltage Vcp exceeds the upper limit threshold or falls below the lower limit threshold, the logic circuit in the three-phase pre-driver circuit 40 stops the operation of the charge pump 43.

In the present embodiment, the output end of the charge pump 43 is connected to the gates of the motor relays 71, 72, 73 provided for respective phases. For example, in the configuration according to the first embodiment, charge pump voltage paths 461, 462, 463 provided for respective phases are branched from a common three-phase charge pump voltage path 46 connected to the output end of the charge pump 43, and are connected to the gates of the motor relays 71, 72, 73 provided for the respective phases.

Accordingly, the motor relays 71, 72, 73 provided for the respective phases are turned on by the output voltage Vcp of the charge pump 43 during the operation of the charge pump 43, except when there is a command (in other words, an interruption signal described hereinafter) from the microcontroller 30. In other words, without adopting a driver circuit dedicated to the motor relays, it is possible to turn on the motor relays 71, 72, 73 by adopting the charge pump voltage Vcp required for driving the upper arm switching elements 61 to 63 of the inverter 60.

In order to intentionally turn off the motor relays 71, 72, 73 during the operation of the charge pump 43, in the first embodiment, a gate interruption switch 47 being a MOSFET is provided between the charge pump voltage path 46 and a ground. The gate interruption switch 47 and the charge pump voltage path 46 are common to the three phases. In the first embodiment, when the interruption signal common to the three phases is provided from the microcontroller 30, the gate interruption switch 47 is turned on to ground the charge pump voltage path 46. As a result, the gate voltage supplied from the output end of the charge pump 43 to the motor relays 71, 72, 73 is interrupted, and the motor relays 71, 72, 73 are simultaneously turned off.

In the normal operation of the three-phase motor 80, the electrical conduction of the three-phase windings 81, 82, 83 starts at the same time, and also stops at the same time. When the back electromotive force generated by the external force is regenerated from the motor 80 to the battery 15 side via the inverter 60, it is considered that the regenerative current flows through the three phases at the same timing. In such a case, it is effective to turn off the motor relays 71, 72, and 73 using a common three-phase interruption signal.

Furthermore, in the configuration example shown in FIG. 1, the output end of the charge pump 43 is connected to the gate of the reverse-connection protective relay 52 via another charge pump voltage path 45. Similarly, the reverse connection protective relay 52 can be turned on using the charge pump voltage Vcp without using a dedicated driver circuit. However, in the present embodiment, driving the reverse connection protective relay 52 is a supplementary matter. In FIG. 2, the illustration of the reverse connection protective relay 52 is omitted.

Figure 6:
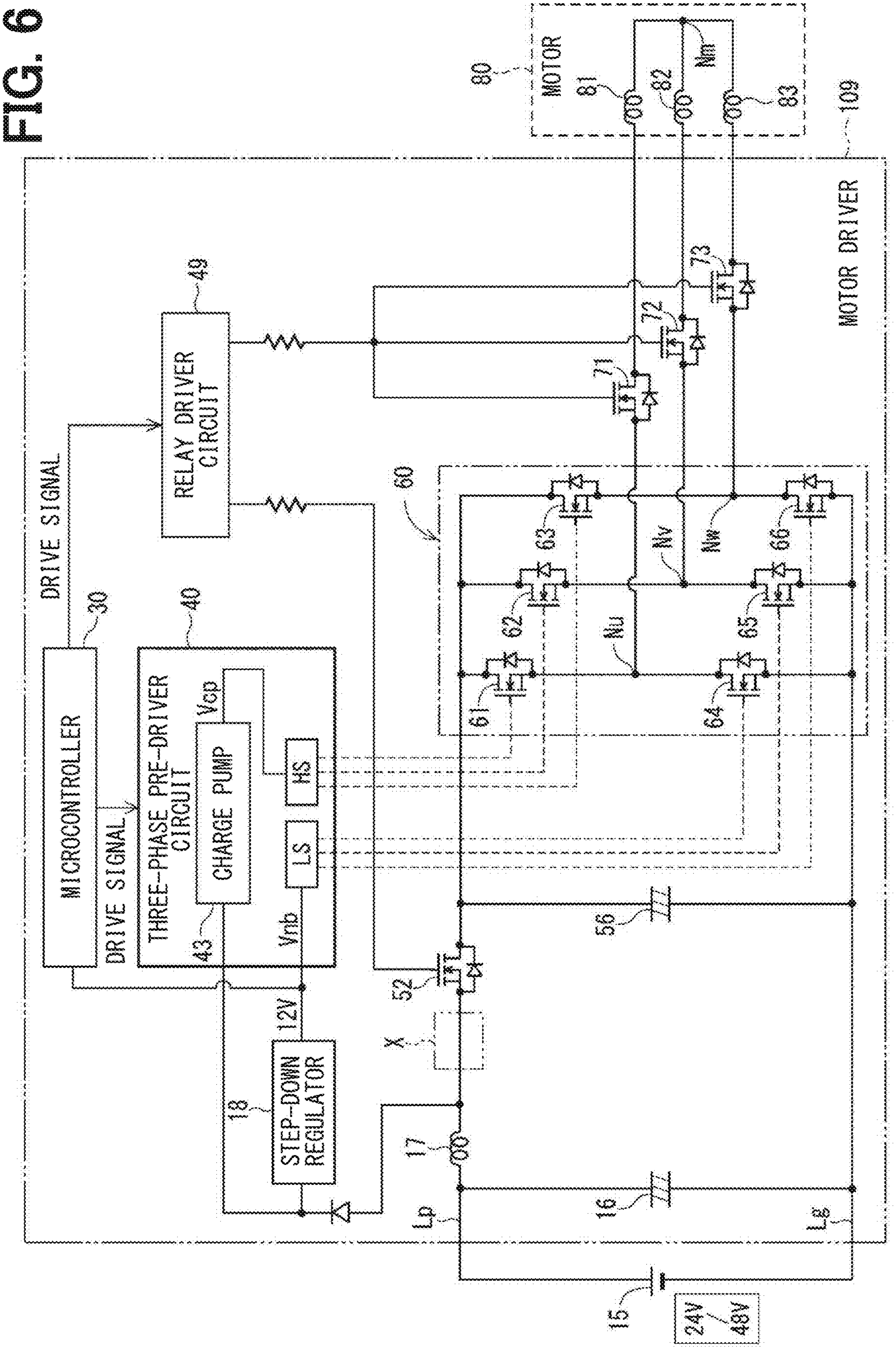
FIG. 6 is a configuration diagram of a motor driver according to a comparative example.

The following describes advantageous effects in the first embodiment as compared with a motor driver 109 according to a comparative example with reference to FIG. 6. The motor driver 109 according to the comparative example includes a relay driver circuit 49 that can commonly drive the motor relays 71, 72, 73 and the reverse connection protective relay 52 based on a drive signal provided from the microcontroller 30.

In the comparative example, although the motor relays 71, 72, 73 and the reverse connection protective relay 52 are shared in a driver circuit to achieve miniaturization and high integration, a dedicated driver circuit for the relays is still required. Therefore, the above configuration related to the comparative example has a larger size and an increased cost.

In contrast, in the first embodiment, since the motor relays 71, 72, and 73 are driven by the output voltage Vcp of the charge pump 43, a driver circuit dedicated to the motor relays is not required. Therefore, the motor relays 71, 72, and 73 can be driven with a simple configuration. For example, when the battery voltage is increased from 12 volts to 24 volts or 48 volts, the charge pump voltage Vcp for driving the inverter 60 is increased, and the motor relays 71, 72, and 73 can also be driven.

Second Embodiment

Figure 3:
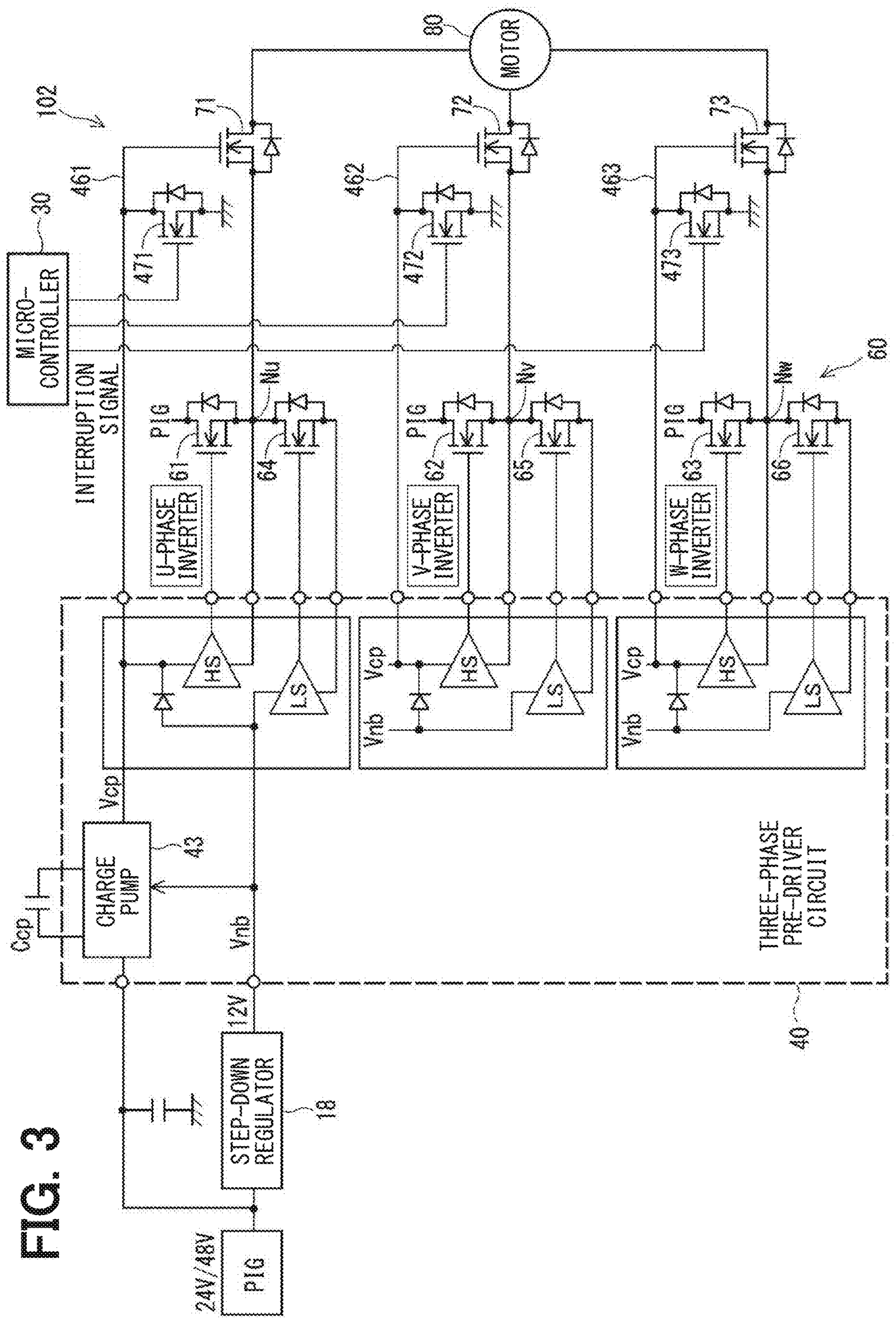
FIG. 3 is a circuit diagram showing a motor relay drive configuration in a motor driver according to a second embodiment.
Figure 4:
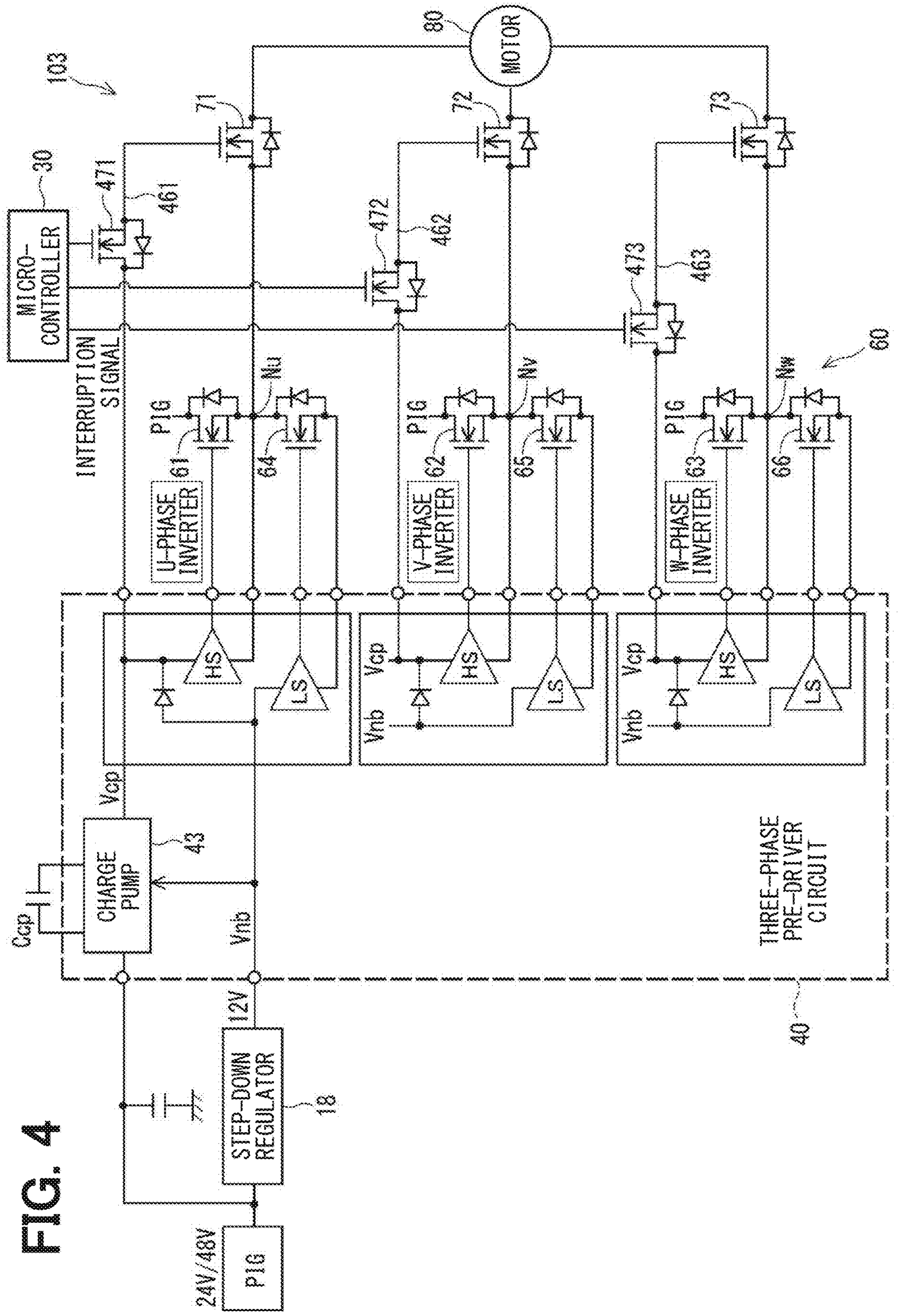
FIG. 4 is a circuit diagram showing a motor relay drive configuration in a motor driver according to a third embodiment.
Figure 5:
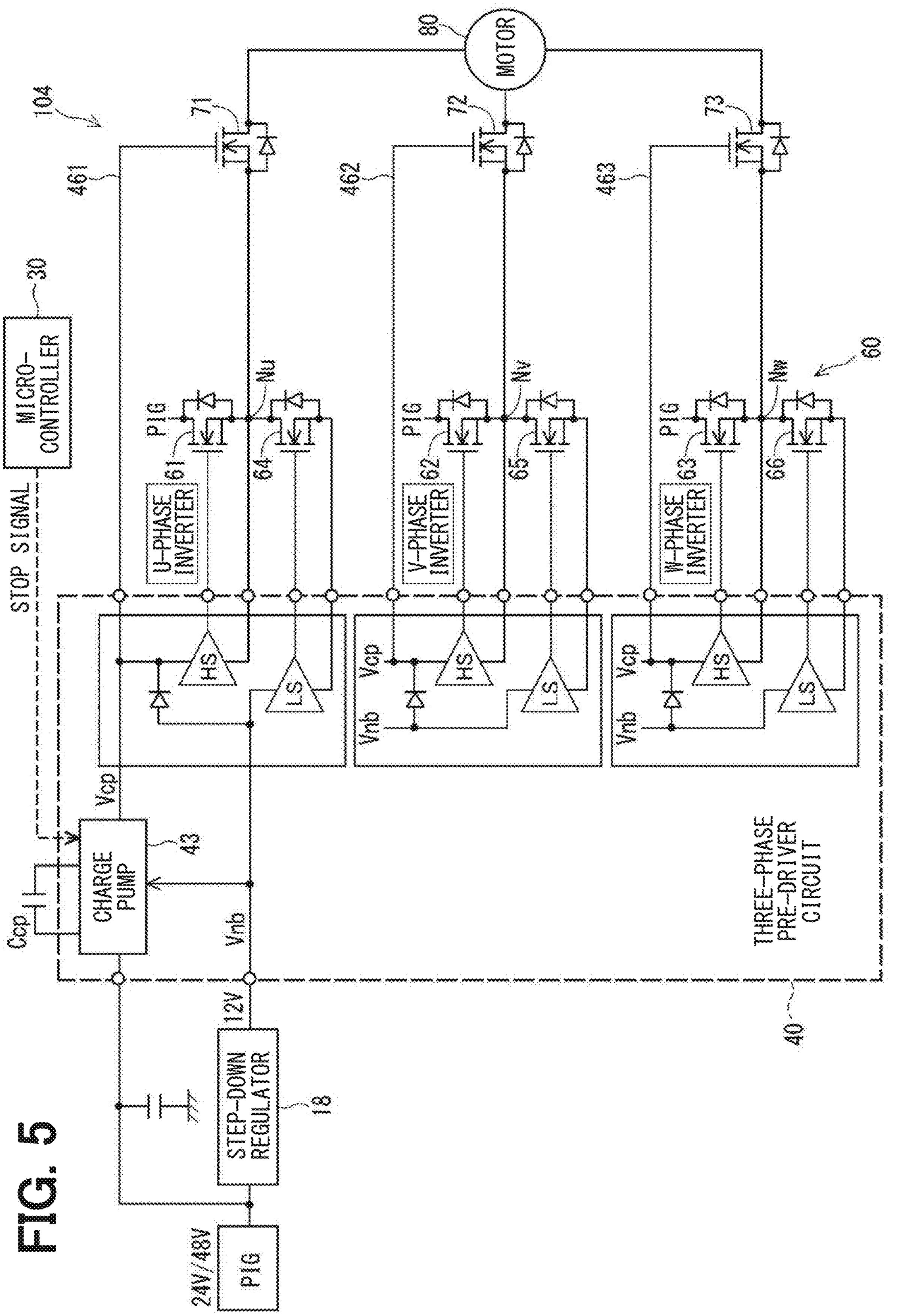
FIG. 5 is a circuit diagram showing a motor relay drive configuration in a motor driver according to a fourth embodiment.

The following describes a second embodiment with reference to FIG. 3. FIGS. 3 to 5 are referred to the second to fourth embodiments, respectively. FIGS. 3 to 5 illustrate drive configuration of the motor relays 71, 72, 73 with reference to FIG. 2 according to the first embodiment. In a motor driver 102 according to the second embodiment, gate interruption switches 471, 472, 473 are provided for the respective phases between the ground and the charge pump voltage paths 461, 462, 463 provided for the respective phases.

The gate interruption switches 471, 472, 473 are turned on when the interruption signal is provided from the microcontroller 30. The gate interruption switches 471, 472, 473 turn off the motor relays 71, 72, 73, which are provided for the respective phases, by grounding the charge pump voltage path 461, 462, 463. Based on the interruption signal for each phase provided from the microcontroller 30, the gate interruption switch 471 individually interrupts the gate voltage supplied to the U-phase motor relay 71; the gate interruption switch 472 individually interrupts the gate voltage supplied to the V-phase motor relay 72; and the gate interruption switch 473 individually interrupts the gate voltage supplied to the W-phase motor relay 73.

Also in the second embodiment, the microcontroller 30 outputs the interruption signal for three phases at the same time, in a case where the electrical conduction of the three phases are normally stopped at the same time. On the other hand, for example, when the inverter switching element or the current sensor included in one of the three phases. In the second embodiment, it is possible to individually interrupt the motor relay included in the phase whose drive is to be stopped.

In the motor driver with a redundant dual-system configuration applied to an electric power steering apparatus, when a single phase included in a single system has a fault, it is possible to stop the entire abnormal system and switch to the normal drive system. Therefore, switching from three-phase drive to two-phase drive is mainly useful in the motor driver with a single system configuration.

Third Embodiment

The following describes a third embodiment with reference to FIG. 4. In a motor driver 103 according to the third embodiment, the gate interruption switches 471, 472, 473 are provided in the middle of the charge pump voltage paths 461, 462, 463 that are provided for the respective phases, respectively. The gate interruption switches 471, 472, 473 individually interrupt the motor relays 71, 72, 73 provided for the respective phases by interrupting the charge pump voltage paths 461, 462, 463 based on the interruption signal for each phase from the microcontroller 30. Also in the third embodiment, the same effects as those of the second embodiments can be obtained.

It is also possible to provide a common gate interruption switch 47, using the same method as the third embodiment, in the middle of the three-phase common charge pump voltage path 46 in FIG. 1 according to the first embodiment.

Fourth Embodiment

The following describes a fourth embodiment with reference to FIG. 5. The gate interruption switches of the motor relays 71, 72, 73 are not provided in a motor driver 104 according to the fourth embodiment. Instead, the microcontroller 30 outputs a signal to stop the operation of the charge pump 43. In the circuit of the charge pump 43, no residual voltage remains after the operation is stopped. By outputting a stop signal to the charge pump 43, the microcontroller 30 stops the operation of the inverter 60 and simultaneously turns off the motor relays 71, 72, and 73 provided for the respective phases. Even with this configuration, the motor relays 71, 72, and 73 can be intentionally turned off.

Other Embodiments

The motor driver according to the present disclosure may not include the reverse connection protective relay. Additionally, it is only necessary to drive the motor relays 71, 72, 73, which are provided for the respective phases, with the charge pump voltage Vcp, and there is no need to drive the reverse connection protective relay with the charge pump voltage Vcp.

The motor relays 71, 72, 73 and the gate interruption switches 47, 471, 472, 473 are not limited to MOSFETs, but may be other semiconductor elements such as bipolar transistors.

The number of phases in the multiphase motor and the multiphase pre-driver circuit may not be limited to three, but may also be two or four or more.

The motor driver according to the present disclosure may be applied to various multiphase motor driver including in-vehicle devices other than electric power steering devices and devices other than devices to be mounted on vehicles.

The present disclosure should not be limited to the embodiment described above. Various other embodiments may be implemented without departing from the scope of the present disclosure.

The controller and the technique according to the present disclosure may be achieved by a dedicated computer provided by constituting a processor and a memory programmed to execute one or more functions embodied by a computer program. Alternatively, the controller and the method described in the present disclosure may be realized by a dedicated computer configured as a processor with one or more dedicated hardware logic circuits. Alternatively, the controller and method described in the present disclosure may be realized by one or more dedicated computer, which is configured as a combination of a processor and a memory, which are programmed to perform one or more functions, and a processor which is configured with one or more hardware logic circuits. The computer program may be stored in a computer-readable non-transitory tangible recording medium as an instruction to be executed by a computer.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A motor driver comprising:

an inverter including pairs of an upper-arm switching element and a lower-arm switching element, the pairs of the upper-arm switching element and the lower-arm switching element being provided for respective phases of a multiphase motor, the upper-arm switching element and the lower-arm switching element being connected in series between a ground line and a power supply line, the power supply line being connected to a battery of an electric vehicle, the battery having a voltage of 24 V or 48 V, the inverter configured to supply converted power to the multiphase motor by converting direct current power of the battery;

a multiphase pre-driver circuit configured to be powered by a voltage supplied from the battery to drive the pairs of the upper-arm switching element and the lower-arm switching element included in the inverter, the multiphase pre-driver circuit including a charge pump configured to boost a voltage of the battery;

a controller configured to control electrical conduction from the inverter to the multiphase motor via transmission of a drive signal to the multiphase pre-driver circuit;

motor relays being semiconductor switching elements corresponding to the respective phases, each of which is configured to be turned off to interrupt a current flowing from the multiphase motor to the inverter, each of the motor relays being connected between an inter-arm connection node and a corresponding one of phase windings of the multiphase motor, the inter-arm connection node being a connection node between the upper-arm switching element and the lower-arm switching element, the charge pump having an output end connected to respective gates of the motor relays corresponding to the respective phases of the multiphase motor;

at least one gate interruption switch configured to interrupt the output voltage supplied from the output end of the charge pump to the respective gates of the motor relays, in response to receiving an interruption signal as the instruction being provided from the controller; and a reverse connection protective relay connected to a freewheeling diode in parallel, the freewheeling diode configured to conduct a current flowing from the battery to the inverter, the reverse connection protective relay having a gate to which the output end of the charge pump is connected, the reverse connection protective relay configured to be turned off to interrupt a current flowing from the inverter to the battery, wherein the motor relays and the reverse connection protective relay are configured to be continuously turned on by an output voltage of the charge pump during an operation of the charge pump unless the controller provides an instruction to turn off the motor relays.

2. The motor driver according to claim 1, wherein:

the at least one gate interruption switch is at least one of gate interruption switches;

the gate interruption switches are provided for the respective phases of the multiphase motor; and the gate interruption switches are configured to interrupt the output voltage supplied from the output end of the charge pump to the respective gates of the motor relays, respectively, based on interruption signals as instructions that are separately provided from the controller and correspond to the respective phases of the multiphase motor.

3. The motor driver according to claim 1, further comprising:

a step-down regulator connected between the multiphase pre-driver circuit and the battery, the step-down regulator configured to step down the voltage of the battery.

4. The motor driver according to claim 1, further comprising:

an LC filter in which a capacitor and an inductor are connected, wherein the reverse connection protective relay is connected between the inductor and the multiphase pre-driver circuit.

5. The motor driver according to claim 1, wherein the charge pump is configured to apply the output voltage to turn on the motor relays without a driver circuit therebetween.

* * * * *